(12) United States Patent
Persson et al.

(10) Patent No.: US 6,754,824 B1
(45) Date of Patent: Jun. 22, 2004

(54) MODULATED MESSAGE AUTHENTICATION SYSTEM AND METHOD

(75) Inventors: Joakim Persson, Lund (SE); Ben Smeets, Dalby (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 0 days.

(21) Appl. No.: 09/415,542

(22) Filed: Oct. 8, 1999

Related U.S. Application Data

(60) Provisional application No. 60/141,178, filed on Jun. 25, 1999.

(51) Int. Cl.[7] ............................................... H04L 9/00
(52) U.S. Cl. ........................... 713/181; 380/42; 380/43; 380/265; 713/168; 714/155; 714/758; 348/466
(58) Field of Search ............................ 380/265, 42, 43; 713/181, 168; 714/155, 758; 348/466

(56) References Cited

U.S. PATENT DOCUMENTS

| | | | |
|---|---|---|---|
| 4,211,891 A | | 7/1980 | Glitz .............................. 375/2 |
| 5,889,864 A | * | 3/1999 | Smith et al. ................. 713/170 |
| 6,574,466 B2 | * | 6/2003 | Papini et al. ............... 455/410 |

FOREIGN PATENT DOCUMENTS

EP   0 805 575 A2   11/1997

OTHER PUBLICATIONS

*LFSR–based Hashing and Authentication*, by Hugo Krawczyk, Proceedings of the Annual International Cryptology Conference, vol. Conf. 14, Aug. 21, 1994, pp. 129–139, XP000467659.
A. Menzes, P. Van Oorschot and S. Vanstone; *Handbook of Applied Cryptography*; CRC Press; 1997; pp. 194–196, 203–204 and 214.

* cited by examiner

*Primary Examiner*—Gregory Morse
*Assistant Examiner*—Paul E. Callahan
(74) *Attorney, Agent, or Firm*—Jenkens & Gilchrist, P.C.

(57) ABSTRACT

A telecommunications system and method is disclosed for implementing a message authentication code (MAC) for transmitted digital information signals. Digital information signals typically include an error detecting code, such as a Cyclic Redundancy Check (CRC) code, to ensure reliable delivery of the information. In order to verify the identity of the sending node, the CRC code can be modulated by a sequence known only to the participating nodes. Thus, the CRC code not only provides an error detecting function, but also serves as a message authentication code.

40 Claims, 5 Drawing Sheets

MODULATED MESSAGE AUTHENTICATION SYSTEM AND METHOD

This application claims the priority under 35 U.S.C. 119(e)(1) of co-pending U.S. Provisional Application No. 60/141,178, filed on Jun. 25, 1999.

BACKGROUND OF THE PRESENT INVENTION

1. Field of the Invention

The present invention relates generally to telecommunications systems and methods for verifying the authenticity of a received message, and specifically to providing a method to verify the identity of the transmitting node.

2. Background and Objects of the Present Invention

A telecommunications network is formed, at a minimum, by a transmitter and a receiver interconnected by a communications channel. The transmitter forms at least a portion of a transmitting node, and the receiver forms at least a portion of a receiving node. Information to be communicated by the transmitter to the receiver is modulated to form communications signals that are transmitted upon the communications channel to the receiving node. Thereafter, the information contained within the communications signals is recovered by the receiving node.

In a radio telecommunications network, the communications channel is formed of a radio channel defined upon a portion of the electromagnetic spectrum. However, radio channels are inherently public in nature. Therefore, a communications signal transmitted upon a radio channel can be detected by any receiving node tuned to that radio channel. Thus, an unauthorized party may be able to intercept the transmitted communications signal. Analogous security problems are also of concern in wireline telecommunications networks in the event that an unauthorized party gains access to the wireline communications channel.

Therefore, to ensure user protection and information secrecy, many telecommunications networks are now providing security measures to the users. For example, many networks require all nodes participating in a communication to provide an authentication key at the time of call setup. In addition, once the identities of the participating nodes have been verified, the authentication keys can be used to derive an encryption key that allows the nodes to encrypt the information transmitted therebetween. However, if after authentication, encryption is not switched on, one of the participating nodes could later be replaced by an unauthorized party without the other node(s) realizing that this has occurred. This has become an especially serious problem in certain countries where only weak ciphering or no ciphering at all is permitted.

Therefore, another security measure implemented by some telecommunications networks to ensure information secrecy is the inclusion of a message authentication code (MAC) along with the transmitted information. In a digital telecommunications network, where digital information signals are formed of sequences of bits, one conventional method of introducing a MAC is to add additional bits to the digital information signal. Exactly what bits to add depends upon the signal itself and a secret key known only to the involved nodes. For example, the extra bits might be computed through a hash function. However, adding bits to the digital information signal increases the complexity of the transmitted communications signal, which undesirably increases the consumption of valuable network resources.

It is, therefore, an object of the present invention to provide a message authentication code to verify the identity of the transmitting node for each transmitted digital information signal.

It is a further object of the present invention to implement a message authentication procedure without adding to the complexity of the transmitted information.

SUMMARY OF THE INVENTION

The present invention is directed to telecommunications systems and methods for implementing a message authentication code (MAC) for transmitted digital information signals. Digital information signals typically include an error detecting code, such as a Cyclic Redundancy Check (CRC) code, to ensure reliable delivery of the information. In order to verify the identity of the transmitting node, the CRC code can be modulated by a sequence known only to the participating nodes. Thus, the CRC code not only provides an error detecting function, but also serves as a message authentication code. This modified CRC code is generated by both the transmitting node and the receiving node initializing a Linear Feedback Shift Register (LFSR) state to a value generated for the current information signal corresponding to a common key known only to the participating nodes. Thereafter, the LFSR is clocked for each new digital information signal. The receiving node further defines a sliding window in which the number of failed CRC checks is counted. If the number of failed CRC checks in the sliding window surpasses a predefined threshold, an alarm at the receiving node is activated indicating that the transmitting node may be an unauthorized party. Thereafter, the receiving node can initiate a new authentication request to the transmitting node.

BRIEF DESCRIPTION OF THE DRAWINGS

The disclosed invention will be described with reference to the accompanying drawings, which show important sample embodiments of the invention and which are incorporated in the specification hereof by reference, wherein.

DETAILED DESCRIPTION OF THE PRESENTLY PREFERRED EXEMPLARY EMBODIMENTS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
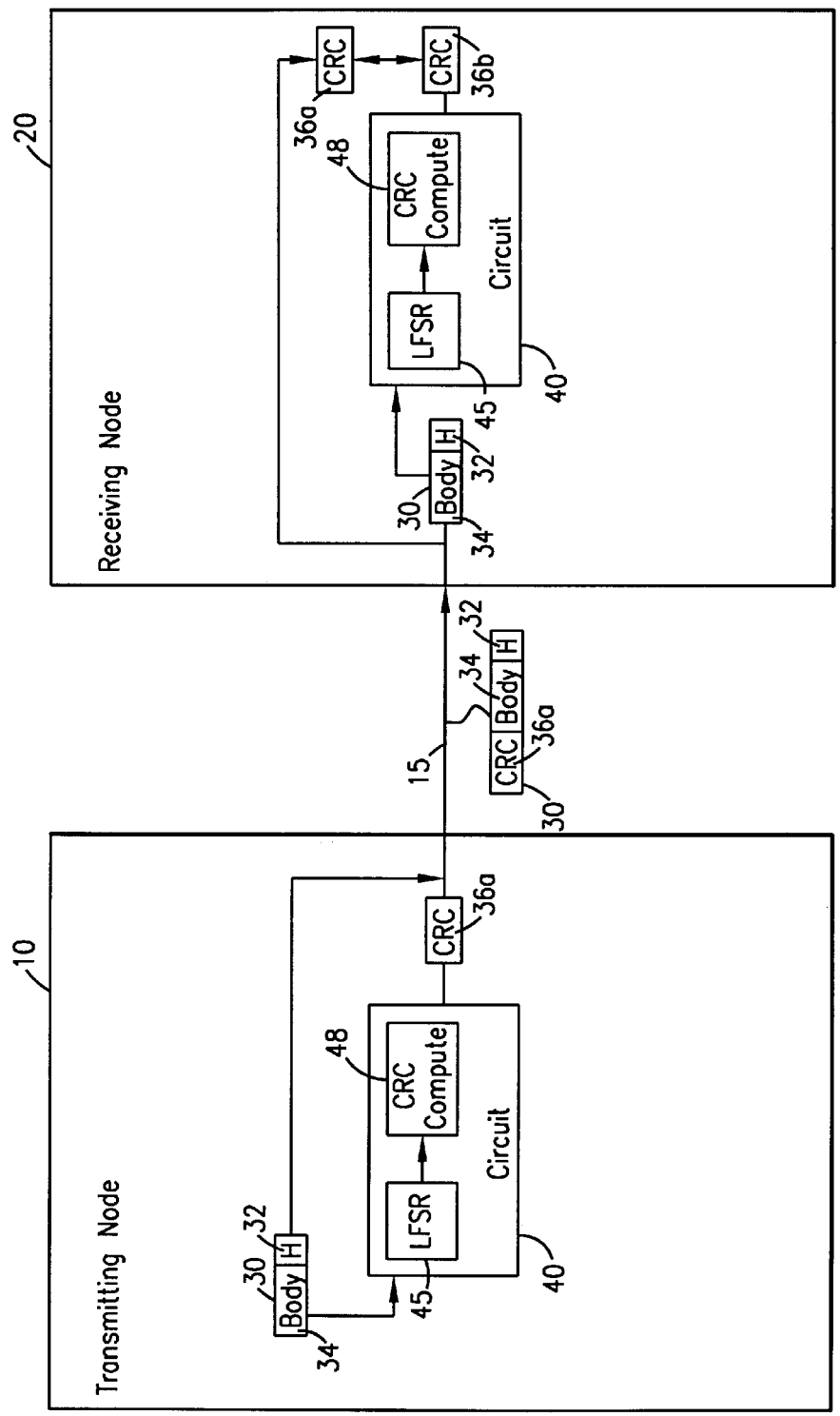
FIG. 1 illustrates the transmission of a payload including an error detection code from a transmitting node to a receiving node.

With reference now to FIG. 1 of the drawings, digital communications signals, hereinafter referred to as payloads 30, can be sent over a communications channel 15 from a transmitting node 10 to a receiving node 20. This communications channel 15 can be a wireline channel or a wireless channel. Each payload 30 typically consists of a payload header 32 specifying, for example, the communications channel used, a payload body 34 containing information, e.g., voice or data, to be transmitted from the transmitting node 10 to the receiving node 20, and an error detecting code 36a.

These error detecting codes 36a ensure the reliable transmission of the information 34 included in the corresponding payloads 30. For example, one type of error detecting code 36a is a Cyclic Redundancy Check (CRC) code. The CRC code 36a is typically generated in a circuit 40 consisting of a Linear Feedback Shift Register (LFSR) 45 and CRC computation logic 48. Before computing the CRC code 36a of the current payload 30, the LFSR 45 is initialized to a known state consisting of, for example, a certain number of bits of the address of the transmitting node 10. Thereafter, the LFSR 45 produces feedback elements used by the CRC calculation logic 48 to calculate the CRC code 36a. This CRC code 36a is appended to the payload body 34 and transmitted to the receiving node 20.

Upon receiving the payload 30, the receiving node 20 performs the same calculation as the transmitting node 10. For example, for each received payload 30, the receiving node 10 initializes the LFSR 45 to the same state as the transmitting node 10 did, and corresponding CRC calculation logic 48 calculates the CRC code 36b for that received payload 30 using the feedback elements generated by the LFSR 45 within the receiving node 20. If the CRC code 36b calculated by the receiving node 20 is the same as the CRC code 36a accompanying the payload 30, the payload 30 is accepted as correctly received.

Figure 2A:
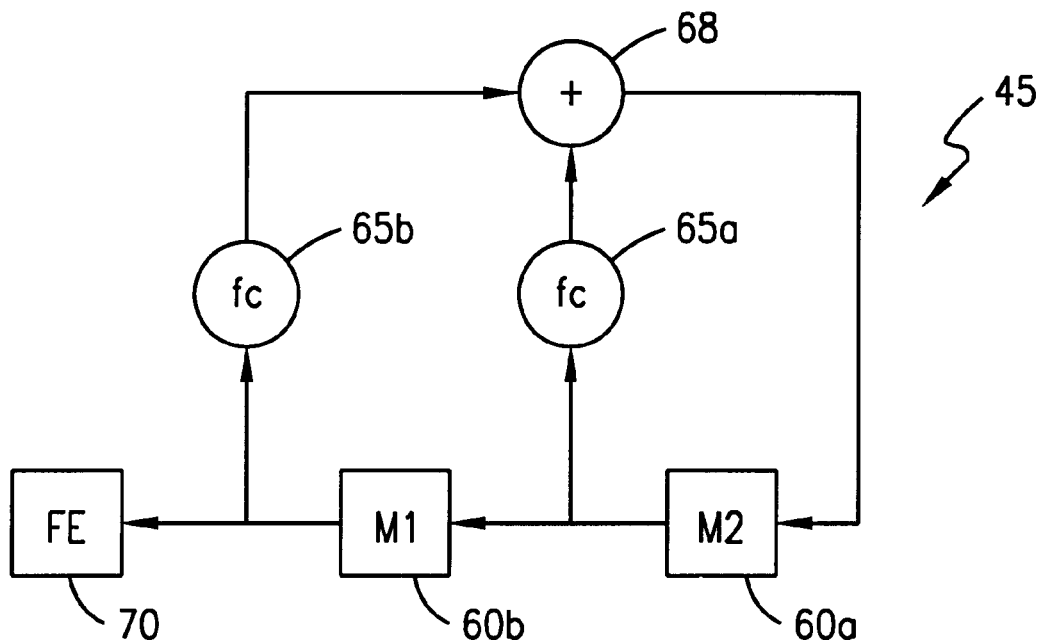
FIGS. 2A and 2B illustrate the generation of linear recurring sequences for use in calculating the error detection code included in the payload shown in FIG. 1 of the drawings.

An example of the generation of feedback elements 70 by the LFSR 45 for use in calculating the CRC codes 36 is shown in FIG. 2A of the drawings. The LFSR 45 consists of cascaded memory boxes 60a and 60b and a feedback network, such that the contents of each memory box 60a and 60b are first multiplied by a feedback coefficient 65a and 65b, respectively, and then summed by an adder 68 to produce the feedback elements 70 used by the CRC calculation logic 48 to calculate the CRC code 36. The number of memory boxes 60a and 60b in the LFSR 45 is referred to as the length of the LFSR 45. In addition, the contents of the memory boxes 60a and 60b form the state of the LFSR 45.

Figure 2B:
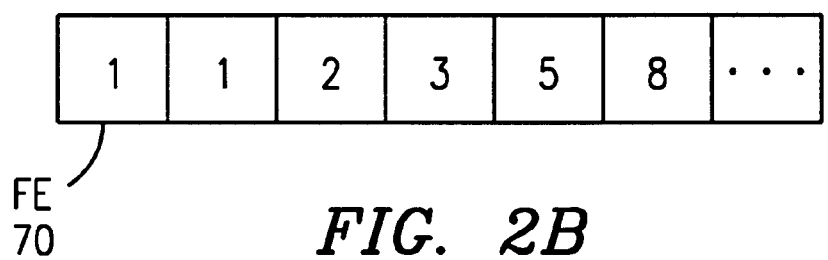

If the LFSR 45 has a length of two, the initial state of each of the memory boxes 60a and 60b are both one, and the feedback coefficients 65a and 65b, respectively, are both one, a linear recurring sequence similar to the one shown in FIG. 2B is formed at the output. This is accomplished by multiplying the contents of the second memory box 60a, which is one, by the first feedback coefficient 65a, which is one, to produce a first number, which is one, and transmitting the contents of the second memory box 60a, which is one, to the first memory box 60b. At the same time, the initial contents of the first memory box 60b, which is one, are output and multiplied by the second feedback coefficient 65b, which is one, to produce a second number. Thereafter, the first and second numbers are added together by the adder 68 (1+1=2), and this sum is loaded into the second memory box 60a. This process repeats resulting in the linear recurring sequence shown in FIG. 2B. This linear recurring sequence is used by the CRC computation logic 48 to calculate the CRC code 36 shown in FIG. 1 of the drawings.

The generation of the CRC code 36 can be described by the following mathematical equations. For example, if the information (of the i-th payload 30) to be transmitted from the transmitting node 10 to the receiving node 20 is represented by the (binary) polynomial $$U(D) = \sum_{i=0}^{k-1} U_i D^i,$$

the CRC bits 36 to be added to the payload 30 can similarly be represented by another polynomial, such as, $$W(D) = \sum_{i=0}^{N-k-1} W_i D^i.$$

W(D) can be computed from U(D) and the generator polynomial $$g(D) = \sum_{i=0}^{N-k} g_i D^i$$

by, for example, performing the following computation:

$$W(D)=(D^{n-k}U(D)) \bmod g(d) \quad\quad\quad \text{(Equation 1)}$$

Thus, the final transmitted payload 30 containing both the information 34 and the CRC bits 36, hereinafter referred to as a codeword, is the concatenation of the bits forming U(D) and W(D). If this codeword is represented by the polynomial $$V(D) = \sum_{i=0}^{N-1} V_i D^i,$$

V(D) can be defined as:

$$V(D)=D^{N-k}U(D)+W(D) \quad\quad\quad \text{(Equation 2)}$$

The computation of the codeword (as polynomial V(D)) can easily be realized by a circuit 40 consisting of an LFSR 45 with feedback polynomial g(D), of the type shown in FIGS. 1 and 2A of the drawings.

Figure 3:
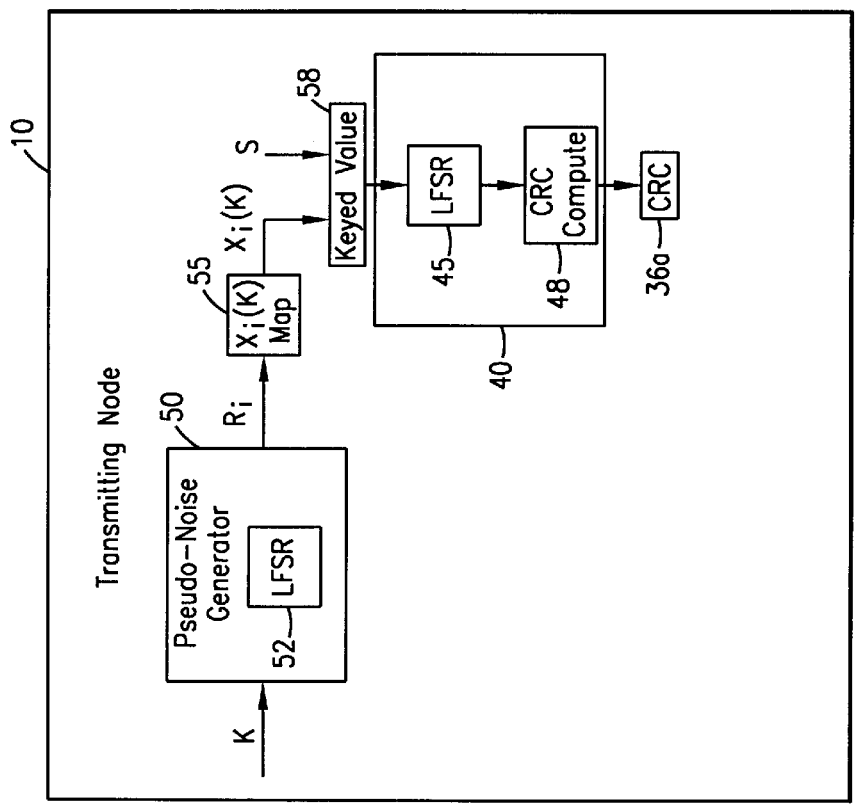
FIG. 3 illustrates the generation of a modulated error detection code for message authentication in accordance with preferred embodiments of the present invention.

With reference now to FIG. 3 of the drawings, in accordance with preferred embodiments of the present invention, in order to provide a message authentication code (MAC) to verify the identity of the transmitting node 10 for each transmitted payload 30 without adding to the complexity of the transmitted information 34, the CRC code 36a can be modulated by a sequence known only to the parties sharing a common key, termed K. This modified CRC code 36a becomes the MAC.

The modified CRC code 36a can be obtained by both the transmitting node 10 and the receiving node 20 modifying the initial LFSR 45 state not to a conventional value, termed S, but rather to a keyed value 58. Thus, instead of setting the initial state of the LFSR 45 for each payload 30 to the initial value S, the initial value of the LFSR 45 can be changed (modulated) for each payload 30 to be transmitted. For example, the initial state $J_i$ for the i-th payload can be set to the following keyed value 58:

$$J_i = S \oplus X_i(K) \quad\quad\quad \text{(Equation 3)}$$

where $X_i(K)$ is a value depending on the payload index i and a key K that the transmitting node 10 and receiving node 20 secretly exchanged prior to communication of the payloads 30, and ⊕ denotes a bit-wise XOR operation, in which S is modulo-2 added to $X_f(K)$. Clearly, the sequences $\{X_f(K)\}$ generated for disparate K should differ.

As shown in FIG. 3, $X_f(K)$ is generated by using a keyed Pseudo-Noise generator (PN-generator) 50 to produce symbols $R_i$. Thereafter, mapping logic 55 maps the symbols $R_i$ of the keyed PN-generator 50 to the $X_f(K)$ symbols. The PN-generator SO can, for example, be an additional LFSR 52 with an appropriate feedback polynomial. In addition, the key K can be the initial state of this additional LFSR 52 or can be the initial state plus a description of the feedback polynomial.

In principle, $X_f(K)$ can be a rather simple function. For instance, $X_f(K)$ may alter randomly between all-zeros and all-ones with a probability of ½. This is easily achieved by initiating the additional LFSR state 52 with K and clocking the additional LFSR 52 for each new payload 30. For example, assuming a binary PN-generator 50, the mapping logic 55 maps $R_i=0$ to $X_f(K)=00 \ldots 0$ and $R_i=1$ to $X_f(K)=11 \ldots 1$. This implies that an adversary has a probability of ½ to guess correctly what value to use for each payload 30. To reduce the probability, $X_f(K)$ can be modulated instead to take any of N equiprobable values, such that an adversary would only succeed with probability 1/N per payload. No matter how many values $X_f(K)$ can take, the mapping logic 55 should map the symbols $R_i$ of the PN-generator 50 to the possible modulating symbols $X_f(K)$ such that, on the average, all possible modulating symbols $X_f(K)$ occur equally often. Preferably, the mapping logic 55 allows a simple adoption between the PN-generator 50 symbol $R_i$ alphabet and the alphabet of $X_f(K)$ symbols. Thus, the mapping logic 55 can map the symbols $R_i$ to the symbols $X_f(K)$ either through a simple table-lookup circuit or through a direct digital circuit realizing the corresponding Boolean function. It should be noted that in some cases, the two alphabets may coincide, and therefore, the mapping logic 55 can effectively be removed.

Figure 4:
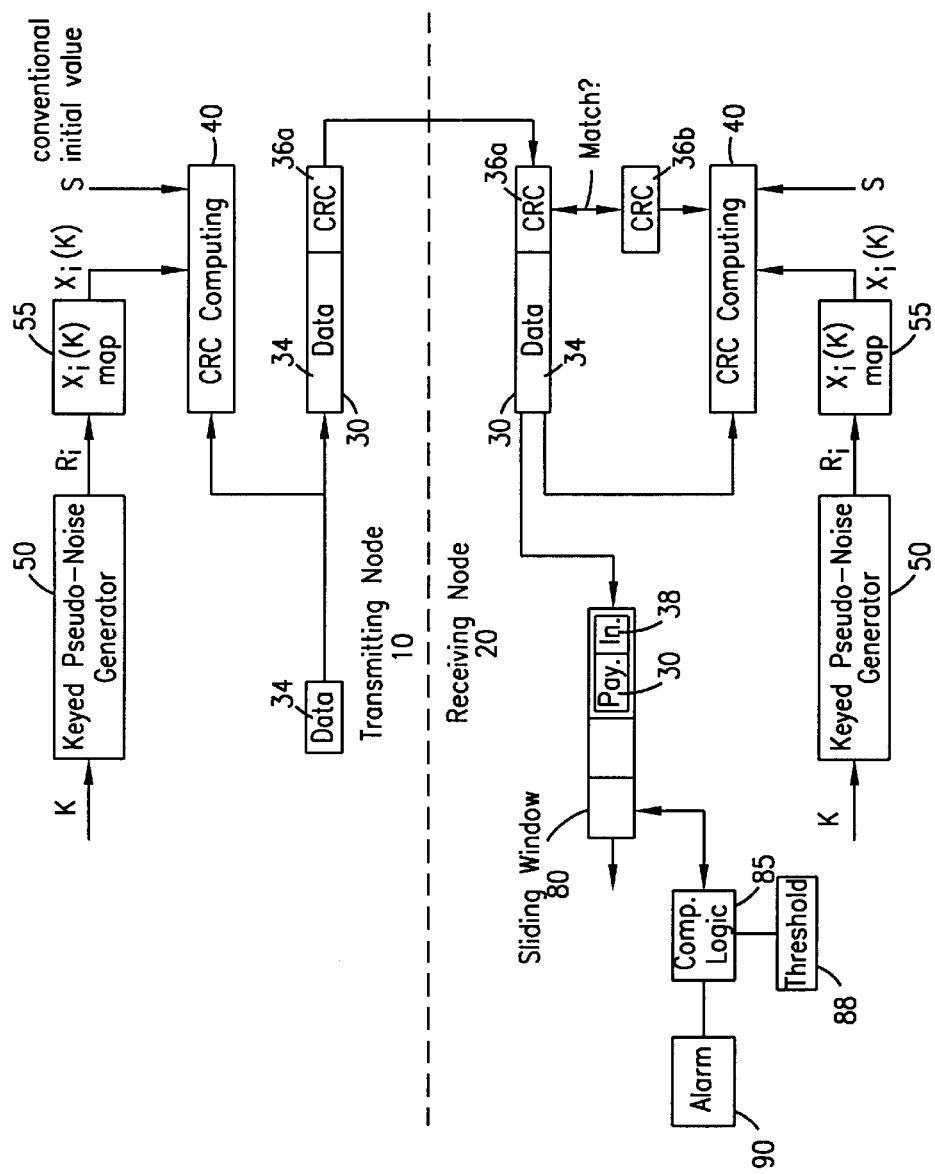
FIG. 4 illustrates a message authentication procedure using the modulated error detection code shown in FIG. 3 of the drawings.
Figure 5:
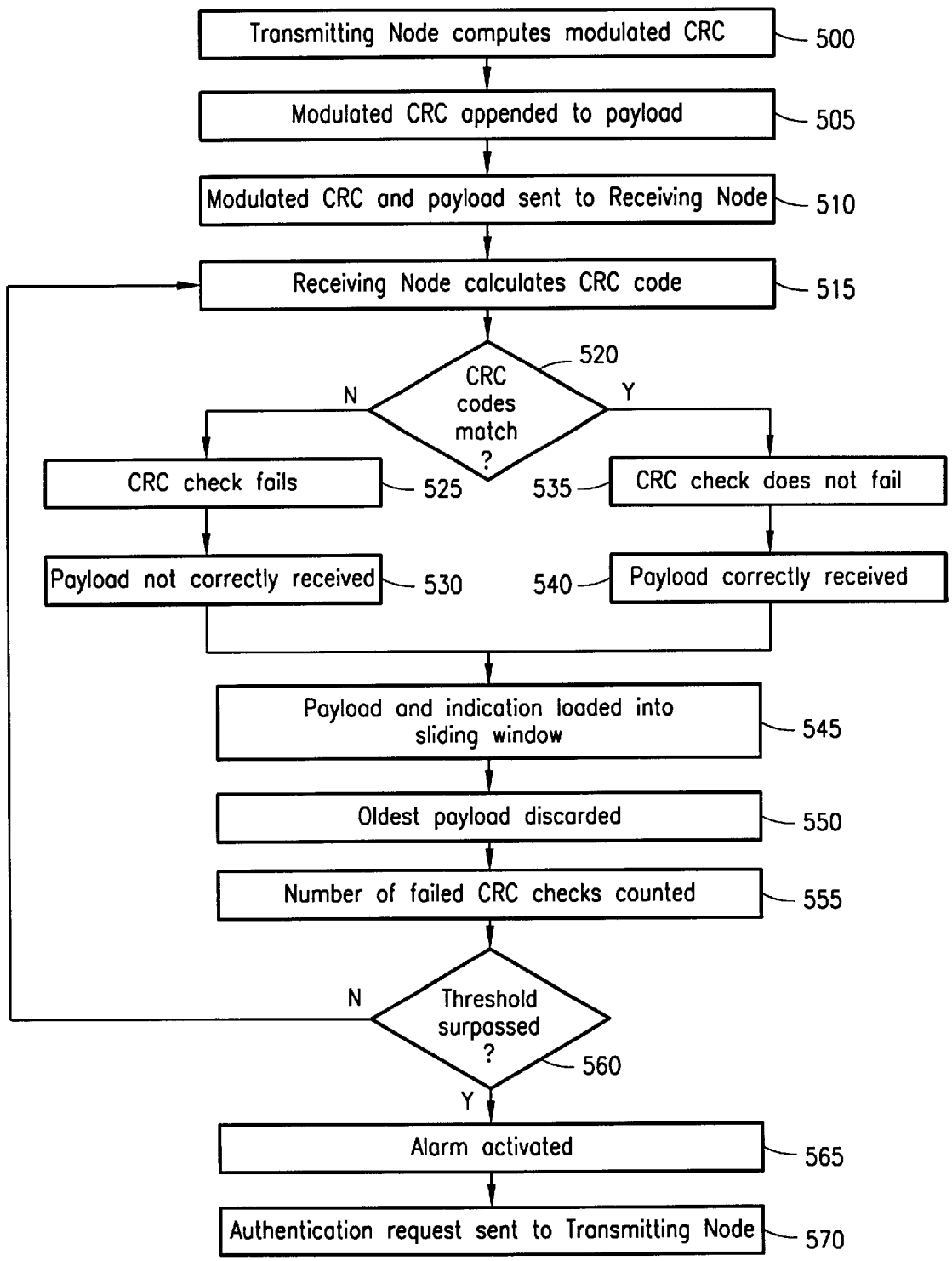
FIG. 5 illustrates the steps for the message authentication procedure shown in FIG. 4 of the drawings.

With reference now to FIG. 4 of the drawings, which will be described in connection with the steps listed in FIG. 5 of the drawings, a message authentication procedure can be implemented using the modulated CRC code 36. Once the transmitting node 10 computes the modulated CRC code 36a for the current payload 30 (step 500), the transmitting node 10 appends this modulated CRC code 36a to the payload 30 (step 505) and sends this payload 30, including the data 34 to be transmitted, and the modulated CRC code 36a to the receiving node 20 (step 510). At the receiving node 20, the receiving node 20 repeats the process performed at the transmitting node 10, and calculates the CRC code 36b for the received payload 30 (step 515). If the calculated CRC code 36b does not match the received CRC code 36a (step 520), the CRC check fails (step 525), and the payload 30 is not considered correctly received (step 530). If the calculated CRC code 36b does match the received CRC code 36a, the CRC check does not fail (step 535), and the payload 30 is considered correctly received (step 540).

In either case (step 530 or step 540), the current received payload 30 and an indication 38 of whether or not the CRC check failed is loaded into a sliding window 80 in the receiving node 20 (step 545). At the same time, the "oldest" payload 30 is discarded from the sliding window 80 (step 550). Thereafter, computation logic 85 within the receiving node 20 computes the number of failed CRC checks in the sliding window 80 (step 555). The computation logic 85 can count the number of failed CRC checks in the sliding window 80 over all the payloads 30 each time a new payload 30 is added and an old payload 30 is removed. Alternatively, and preferably, the computation logic 85 can remove the contribution to the computation of the discarded payload 30 and add the contribution of the new payload 30 to the computation.

If the number of failed CRC checks in the sliding window 80 surpasses a predefined threshold 88 (step 560), an alarm 90 within the receiving node 20 is activated (step 565). If not (step 560), the receiving node 20 continues to accept new payloads 30 from the transmitting node 10 (step 515). If the alarm 90 in the receiving node 20 is activated (step 565), the receiving node 20 initiates a new authentication request to the transmitting node 10 to ensure that the transmitting node 10 has not been replaced by an adversary (step 570). In general, the number of possible values for $X_f(K)$, the setting of the threshold 88, and the sliding window 80 size determine the security level against the attacks by an adversary.

In an alternative embodiment, instead of modulating the CRC error detecting code 36, an error correcting code capable of correcting transmission errors can be modulated with the key K. By appropriate choice of g(D), the error-correcting code can be obtained. One example of a common error correcting code is a burst error-correcting Fire code.

As will be recognized by those skilled in the art, the innovative concepts described in the present application can be modified and varied over a wide range of applications. Accordingly, the scope of patented subject matter should not be limited to any of the specific exemplary teachings discussed, but is instead defined by the following claims.

What is claimed is:

1. A telecommunications system for providing authentication with each transmitted payload to verify the source of each transmitted payload, comprising:

a transmitting node for calculating a first error code for a select one of a plurality of payloads, said first error code being modulated using a key, said transmitting node appending said modulated first error code to said select payload and transmitting said modulated first error code and said select payload; and a receiving node for receiving said modulated first error code and said select payload and calculating a second error code for said select received payload, said second error code being modulated using said key, said receiving node further comparing said first and second error codes to verify the identity of said transmitting node;

wherein said key is known only to said transmitting node and said receiving node; and wherein said transmitting node further comprises:
means for generating at least one symbol, said at least one symbol being derived from said key;
means for mapping said at least one symbol to a keyed symbol;
means for generating a keyed value, said keyed value being derived from said keyed symbol;
a first feedback shift register for generating at least one feedback element, wherein an initial state of said first feedback shift register is set to said keyed value; and
means for computing said modulated first error code using said at least one feedback element and information within said payload.

2. The telecommunications system of claim 1, wherein said first feedback shift register comprises:
a first linear feedback shift register.

3. The telecommunications system of claim 1, wherein said means for generating at least one symbol comprises:
a first pseudo-noise generator for generating at least one symbol.

4. The telecommunications system of claim 1, wherein said keyed value comprises the modulo-2 sum of said keyed symbol and a conventional value.

5. The telecommunications system of claim 3, wherein said first pseudo-noise generator comprises a second linear feedback shift register.

6. The telecommunications system of claim 5, wherein an initial state of said second linear feedback shift register is set to said key.

7. The telecommunications system of claim 5, wherein said key comprises an initial state of said second linear feedback shift register and a feedback polynomial associated with said second linear feedback shift register.

8. The telecommunications system of claim 7, wherein said receiving node further comprises:
a third linear feedback shift register for generating at least one additional feedback element; and
means for computing said modulated second error code using said at least one additional feedback element and said information within said select received payload.

9. The telecommunications system of claim 8, wherein an initial state of said third linear feedback shift register is set to an additional keyed value derived from said key.

10. The telecommunications system of claim 9, wherein said receiving node further comprises:
a second pseudo-noise generator for generating at least one additional symbol; and
means for mapping said at least one additional symbol to an additional keyed symbol.

11. The telecommunications system of claim 10, wherein said additional keyed value comprises the modulo-2 sum of said additional keyed symbol and a conventional value.

12. The telecommunications system of claim 10, wherein said second pseudo-noise generator comprises a fourth linear feedback shift register.

13. The telecommunications system of claim 12, wherein an initial state of said fourth linear feedback shift register is set to said key.

14. The telecommunications system of claim 12, wherein said key comprises an initial state of said fourth linear feedback shift register and a feedback polynomial associated with said fourth linear feedback shift register.

15. The telecommunications system of claim 1, wherein said receiving node further comprises:
a sliding window for storing a predetermined number of said plurality of received payloads and an indication for each of said predetermined number of said plurality of received payloads of whether said respective modulated first and second error codes match.

16. The telecommunications system of claim 15, wherein said receiving node further comprises:
means for computing an indication number associated with the number of said indications within said sliding window that indicate that said associated modulated first and second error codes do not match.

17. The telecommunications system of claim 16, wherein said receiving node further comprises:
a threshold value; and
an alarm, said alarm being activated when said indication number exceeds said threshold value.

18. The telecommunications system of claim 17, wherein said receiving node initiates a new authentication request to said transmitting node when said alarm is activated.

19. The telecommunications system of claim 1, wherein said first error code is a Cyclic Redundancy Check code.

20. The telecommunications system of claim 1, wherein said first error code is an error correcting code.

21. A method for providing a message authentication code for each of a plurality of payloads transmitted from a transmitting node to a receiving node, comprising the steps of:
generating a keyed value for a select one of said plurality of payloads, said keyed value being derived from a key known only to said transmitting node and said receiving node;
generating an error code modulated using said keyed value; and
transmitting said select payload and said modulated error code to said receiving node;
wherein said step of generating said keyed value further comprises:
generating at least one symbol, said at least one symbol derived from said key;
mapping said at least one symbol to a keyed symbol;
generating said keyed value, said keyed value being derived from said keyed symbol; and
wherein said step of generating the modulated error code further comprises:
generating, by a first feedback shift register within said transmitting node, at least one feedback element;
initializing said first feedback shift register to said keyed; and
computing said modulated error code using said at least one feedback element and information within said select payload.

22. The method of claim 21, wherein said first feedback shift register comprises:
a first linear feedback shift register.

23. The method of claim 21, wherein:
said step of generating said at least one symbol is performed, by a second linear feedback shift register within said transmitting node; and
said keyed value comprises the modulo-2 sum of said keyed symbol and a conventional value.

24. The method of claim 23, wherein said step of generating said keyed value further comprises the step of:
initializing said second linear feedback shift register to said key.

25. A method for verifying the source of a plurality of payloads received at a receiving node, comprising the steps of:
receiving, at said receiving node, a select one of said plurality of payloads and a first modulated error code associated with said select payload from a transmitting node;
generating a keyed value for said select received payload, said keyed value being derived from a key known only to said transmitting node and said receiving node;
generating a second error code modulated using said keyed value; and
comparing said modulated first and second error codes to verify the identity of said transmitting node; and
wherein said step of generating said keyed value further comprises:
generating at least one symbol, said at least one symbol derived from said key;
mapping said at least one symbol to a keyed symbol;
generating said keyed value, said keyed value being derived from said keyed symbol; and
wherein said step of generating the modulated second error code further comprises:
generating, by a first feedback shift register within said receiver node, at least one feedback element;
initializing said first feedback shift register to said keyed value; and
computing said modulated second error code using said at least one feedback element and information within said select payload.

26. The method of claim 25, wherein said first feedback shift register comprises a first linear feedback shift register.

27. The method of claim 25, wherein:

said step of generating said at least one symbol is performed by a second linear feedback shift register within said receiving node; and said keyed value comprises the modulo-2 sum of said keyed symbol and a conventional value.

28. The method of claim 27, wherein said step of generating said keyed value further comprises the step of:

initializing said second linear feedback shift register to said key.

29. The method of claim 25, wherein said step of comparing further comprises the step of:

storing within a sliding window within said receiving node a predetermined number of said plurality of received payloads and an indication for each of said predetermined number of said plurality of received payloads of whether said respective modulated first and second error codes match.

30. The method of claim 29, wherein said step of comparing further comprises the step of:

computing an indication number associated with the number of said indications within said sliding window that indicate that said associated modulated first and second error codes do not match.

31. The method of claim 30, wherein said step of comparing further comprises the step of:

activating an alarm when said indication number exceeds a threshold value stored within said receiving node.

32. The method of claim 31, further comprising the step of:

initiating a new authentication request from said receiving node to said transmitting node when said alarm is activated.

33. A telecommunications system for providing authentication with each transmitted payload to verify the source of each transmitted payload, comprising:

a transmitting node for calculating a first error code for a select one of a plurality of payloads, said first error code being modulated using a key, said transmitting node appending said modulated first error code to said select payload and transmitting said modulated first error code and said select payload; and a receiving node for receiving said modulated first error code and said select payload and calculating a second error code for said select received payload, said second error code being modulated using said key, said receiving node further comparing said first and second error codes to verify the identity of said transmitting node;

wherein said key is known only to said transmitting node and said receiving node; and wherein said receiving node further comprises:

a sliding window for storing a predetermined number of said plurality of received payloads and an indication for each of said predetermined number of said plurality of received payloads of whether said respective modulated first and second error codes match; and means for computing an indication number associated with the number of said indications within said sliding window that indicate that said associated modulated first and second error codes do not match.

34. The telecommunications system of claim 33, wherein said receiving node further comprises:

a threshold value; and an alarm, said alarm being activated when said indication number exceeds said threshold value.

35. The telecommunications system of claim 34, wherein said receiving node initiates a new authentication request to said transmitting node when said alarm is activated.

36. The telecommunications system of claim 33, wherein said first error code is a Cyclic Redundancy Check code.

37. The telecommunications system of claim 33, wherein said first error code is an error correcting code.

38. A method for verifying the source of a plurality of payloads received at a receiving node, comprising the steps of:

receiving, at said receiving node, a select one of said plurality of payloads and a first modulated error code associated with said select payload from a transmitting node;

generating a keyed value for said select received payload, said keyed value being derived from a key known only to said transmitting node and said receiving node;

generating a second error code modulated using said keyed value; and comparing said modulated first and second error codes to verify the identity of said transmitting node;

wherein said step of comparing further comprises the step of:

storing within a sliding window within said receiving node a predetermined number of said plurality of received payloads and an indication for each of said predetermined number of said plurality of received payloads of whether said respective modulated first and second error codes match; and computing an indication number associated with the number of said indications within said sliding window that indicate that said associated modulated first and second error codes do not match.

39. The method of claim 38, wherein said step of comparing further comprises the step of:

activating an alarm when said indication number exceeds a threshold value stored within said receiving node.

40. The method of claim 39, further comprising the step of:

initiating a new authentication request from said receiving node to said transmitting node when said alarm is activated.

* * * * *

UNITED STATES PATENT AND TRADEMARK OFFICE
CERTIFICATE OF CORRECTION

PATENT NO.   : 6,754,824 B1
DATED        : June 22, 2004
INVENTOR(S)  : Joakim Persson et al.

It is certified that error appears in the above-identified patent and that said Letters Patent is hereby corrected as shown below:

Column 5,
Line 7, replace "PN-generator SO" with -- PN-generator 50 --

Signed and Sealed this

Twenty-third Day of November, 2004

JON W. DUDAS
*Director of the United States Patent and Trademark Office*